United States Patent
Tsubaki et al.

[11] Patent Number: 5,717,048
[45] Date of Patent: Feb. 10, 1998

[54] CATION-MODIFIED ACRYLAMIDE OR METHACRYLAMIDE COPOLYMER AS WELL AS ANTISTATIC AGENT, THERMOPLASTIC RESIN COMPOSITION, AQUEOUS COMPOSITION AND THERMOPLASTIC RESIN LAMINATE COMPRISING SAME

[75] Inventors: Takayuki Tsubaki, Kyoto; Hideyuki Sumi, Osaka; Hiroshi Hotta, Kyoto, all of Japan

[73] Assignee: Dai-Ichi Kogyo Seiyaku Co., Ltd., Kyoto, Japan

[21] Appl. No.: 566,266

[22] Filed: Dec. 1, 1995

[30] Foreign Application Priority Data

Dec. 7, 1994 [JP] Japan ................ 6-303835

[51] Int. Cl.$^6$ ............... C08F 228/02; C08F 226/02; C08F 220/18; C08F 210/02
[52] U.S. Cl. ............... 526/287; 526/312; 526/318.45; 526/329; 526/348
[58] Field of Search .................. 526/312, 287, 526/318.45, 329, 348

[56] References Cited

U.S. PATENT DOCUMENTS 5,202,193  4/1993  Sumi et al. ................. 428/479.6

FOREIGN PATENT DOCUMENTS

| 0108911 | 5/1984 | European Pat. Off. |
| 0276111 | 7/1988 | European Pat. Off. |
| 0492163A2 | 7/1992 | European Pat. Off. |
| 3404743A1 | 8/1985 | Germany |
| 3629149C1 | 11/1987 | Germany |
| 63-246750 | 10/1988 | Japan |
| 4-198307 | 7/1992 | Japan |
| 4-198308 | 7/1992 | Japan |
| 4-292638 | 10/1992 | Japan |
| 6-73210 | 3/1994 | Japan |
| 6-179716 | 6/1994 | Japan |

*Primary Examiner*—Joseph L. Schofer
*Assistant Examiner*—Wu C. Cheng
*Attorney, Agent, or Firm*—Jordan and Hamburg

[57] ABSTRACT

The present invention provides a cation-modified linear copolymer which comprises, within the molecule thereof, 95 to 85 mole % of an ethylene structural unit, 0.1 to 10 mole % of an ester structural unit represented by general formula (II), 0.1 to 6 mole % of an acrylic or methacrylic acid structural unit and 1 to 12 mole % of an amide structural unit represented by general formula (IV). The copolymer has a weight-average molecular weight of 1,000 to 100,000. When incorporated in thermoplastic resins, it shows good compatibility and results in good mechanical properties.

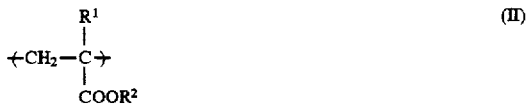

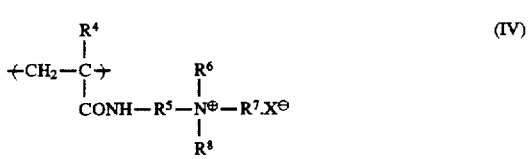

4 Claims, 3 Drawing Sheets

CATION-MODIFIED ACRYLAMIDE OR METHACRYLAMIDE COPOLYMER AS WELL AS ANTISTATIC AGENT, THERMOPLASTIC RESIN COMPOSITION, AQUEOUS COMPOSITION AND THERMOPLASTIC RESIN LAMINATE COMPRISING SAME

BACKGROUND OF THE INVENTION

The present invention relates to a novel cation-modified acrylamide or methacrylamide copolymer as well as to an antistatic agent, thermoplastic resin composition, aqueous composition and thermoplastic resin laminate comprising said cation-modified copolymer.

Cation-modified polyolefins retain the excellent processability, low temperature characteristics and flexibility of polyolefins and have cationic groups and, therefore, they are in wide use as antistatic agents, electroconductive resins, agents for statically charging toners, sizing agents for paper, antimicrobial agents, glass coating agents and so forth and are becoming industrially important materials.

Such cation-modified polyolefins include, for example, the following species (a) through (i): (a) In EP-A-0258724 and JP-A-63057609, there are disclosed modified polyethylenes with a molecular weight of 500 to 10,000 (preferably 1,000 to 5,000) as derived from polyethylene by introducing 1 to 10 (preferably 1 to 5) cationized acrylamide units per molecule into polyethylene side chains. They are supposed to be useful as coating agents for glass vessels.

The method of production thereof, as disclosed, comprises reacting oxidized polyethylene with a molar excess of a dialkylaminoalkylamine for amidation, followed by quaternization with a quaternizing agent such as an alkyl halide or an alkyl sulfate ester. (b) In JP-A-63246750, there are disclosed cation-modified polyolefins derived from a copolymer resin produced from an unsaturated carboxylic acid such as maleic anhydride or acrylic acid and an olefin by reacting the resin with at least 1 mole, per mole of the carboxyl group, of an amine such as N,N-dimethyl-1,3-propanediamine for conversion into an imide, amide or amine salt, followed by exhaustive or partial quaternization with a quaternizing agent such as an alkyl halide, aryl halide, trialkyl phosphonate or alkylaryl sulfonate, optionally further followed by modification of the negative counter ion structure by reaction with a sulfonic acid salt, for instance. It is disclosed that these cation-modified polyolefins are useful as agents for statically charging toners to be used in electrophotography. (c) In JP-A-63304010 and JP-A-02036106, there is disclosed a method of preparing an aqueous dispersion of cation-modified polyethylene which comprises quaternizing, with an epihalohydrin, the hydrochloride of an ethylene-dialkylaminoalkylacrylamide or ethylene-dialky-laminoalkylacrylamide-methacrylate ester (the latter ester being introduced as a matter of convenience on the occasion of production and for the purpose of increasing the copolymer flexibility) copolymer obtained by radical copolymerization having a molecular weight of 5,000 to 50,000. The product thus obtained is allegedly effective as an antistatic agent to be applied to plastic films, as an electroconductive layer of a medium of electrostatic recording, and as a microbicide. (d) In JP-A-04198308 and JP-A-04198307, there are disclosed, by the present inventors, ethylene-acrylate ester-acryloylaminoalkyltrialkylammonium copolymers and a method for their production. The cation-modified copolymers contain acrylic acid ester units positively introduced thereinto and, as a result, have the following practical advantages.

Thus, when incorporated into thermoplastic resins, they provide the resins with toughness and shock resistance, hence causing only slight decreases in physical characteristics. When used in the conductive layer of an electrostatic recording medium, they show good film-forming property and bring about good conductivity as well as good solvent resistance. Furthermore, when used, in an aqueous dispersion form, as coating-type antistatic agents in plastics, they show good film-forming property, hence good conductivity and good adhesion to the substrates. (e) In JP-A-60229904 (JP-B-05017923), there are described examples in which a product of quaternization of an aminoalkyl acrylate is used as an antistatic functional group. In the examples, a cationic copolymer obtained by quaternizing an ethylene-ethyl acrylate-dimethylaminoethyl acrylate terpolymer with a trialkyl phosphate is blended with a polyolefin resin, polyester elastomer, polystyrene resin, ABS resin, polyamide resin and the like to give an antistatic resin composition. (f) In JP-A-06179716, there are disclosed, by the present inventors, ethylene-acrylic acid-acrylate ester-acryloylaminoalkyltrialkylammonium copolymers and a method for their production. These cation-modified copolymers contain not only acrylate ester units but also positively introduced carboxylic acid units and, as a result, have the advantages detailed below.

The, the carboxylic acid units and amide structure units form intermolecular ionic bonds to thereby apparently increase the molecular weight of such a cation-modified copolymer. As a result, the viscosity, from melt kneading the copolymer becomes comparable to that of a thermoplastic resin to be molded and the copolymer is finely dispersed in the resin to provide a high level of antistatic effect at low addition levels. Furthermore, owing to the formation of ionic bonds as mentioned above, the resin internally supplemented with the cation-modified copolymer acquires improved shock resistance and flexibility. (g) In JP-A-04292638, there is described a method of producing antistatic coatings which comprises using a cationic acrylate as an antistatic function group, and applying to a substrate the cationic acrylate and a polymerizable compound which contains at least two acryloyloxy and/or methacryloyloxy groups, together with an acryloyl derivative having alkylene oxide groups as side chains, followed by crosslinking for curing. The method uses, as the cationic acrylate, a product of quaternization of an aminoalkyl acrylate with a sulfate or sulfonate ester. (h) In JP-A-06073210, there is described a method of obtaining antistatic coatings which comprises applying a mixture of a polyfunctional acrylate and an amino-containing acrylate to a substrate, then photocuring the coating using a photopolymerization initiator and treating, with heating, the cured coating with an alkyl sulfate ester or sulfonate ester for quaternary ammonium salt formation. There are disclosed, by way of example, certain resin films and resin sheets thus rendered antistatic. (i) In JP-A-05032808, it is stated that synthetic resin moldings with durable and high-level antistatic property can be obtained by applying a partial quaternization reaction product derived from an amino-containing alkoxysilane and an alkyl sulfate ester or sulfonate ester and that the moldings are effectively applicable in manufacturing photomagnetic disks and the like.

The prior art cation-modified polyolefins mentioned above, however, when incorporated, in the practical use thereof, into polyolefins, styrenic resins, ABS resins, polymethyl methacrylate (P-MMA) resins, polyesters, polyamides, polycarbonates and like thermoplastic resins to give antistatic polymer alloys, for instance, pose the problems outlined below.

The use of the cation-modified polyolefins mentioned above under (a) and (b) in film production results in deteriorated transparency of the films because of poor compatibility. Mechanical characteristics, typically shock resistance, are also markedly decreased. The cation-modified polyolefins mentioned above under (c) and (d) are indeed improved versions with respect to compatibility but are not satisfactory with respect to shock resistance and other mechanical characteristics.

In the above-mentioned case (e), the trialkyl phosphate to be used for quaternization is expensive and renders the antistatic resins economically disadvantageous. In addition, the quaternization reaction generally fails to proceed quantitatively and, as a result, there remain unreacted tertiary amino groups, namely dimethylaminoethyl acrylate units. The use of a cation copolymer containing the remaining dimethyl-aminoethyl acrylate units as a resin composition component results not only in inferior antistatic property but also in discoloration supposedly due to denaturation of the remaining amino groups in the step of processing under heating or, when said copolymer is incorporated in thermoplastic resins containing amide or ester bonds, such as polyamide resins and polyester resins, marked decreases in mechanical strength characteristics tend to result.

On the other hand, in the above-mentioned cases (d) and (f), the extent of discoloration during processing under heating is less as compared with the case (e) mentioned above, hence the cationic copolymer can be suitably used. However, with this copolymer, one cannot yet satisfactorily cope with the raised processing temperature required for resin processing at increased speeds.

When the above-mentioned prior art cation-modified polyolefins are used in aqueous dispersion form, the following problems are encountered. Thus, the cation-modified polyolefins mentioned above under (a) and (b) are inferior in conductivity, and the cation-modified polyolefins mentioned above under (c) and (d) have indeed improved conductivity but are still unsatisfactory in adhesion to plastic, glass, paper and other substrate surfaces.

The coating-type antistatic agents described in the publications cited above under (g), (h) and (i) are cured on the substrate surface to acquire a crosslinked structure, hence improving frictional resistance and adhesion to substrate surfaces. However, the curing of them may often be insufficient under certain curing conditions. If the curing is insufficient, stickiness of the substrate surface, namely the so-called tack, will result and the substrate, when piled one on top of the other, may possibly become inseparable from one another. Furthermore, since the antistatic agents are to be subjected to coating and curing, the range of applications thereof is naturally limited and the agents cannot yield thermoplastic resin compositions.

In the publication cited above under (e), mention is made, by way of example, of an antistatic paper sheet or polyester film obtained by coating the paper sheet or film with an aqueous dispersion of the cationic copolymer mentioned above. In that case, however, economic disadvantages cannot yet be overcome.

For economically improved production of films, trimmings resulting from film cutting are generally melted by heating for recycling. Accordingly, even coating-type antistatic agents are required to be heat-resistant. In such a case, the aqueous dispersions mentioned above under (c), (d) and (f) are quite incompetent, while the antistatic agents mentioned above under (g), (h) and (i), which are heat-curable, cannot be used for recycling at all.

SUMMARY OF THE INVENTION

Accordingly, it is an object of the present invention, which has been made in view of the problems with the above-mentioned prior art, to provide a cation-modified copolymer which, when incorporated in polyolefin and other thermoplastic resins to give antistatic polymer alloys, can produce an adequate antistatic effect, show good compatibility and provide good mechanical characteristics, inclusive of shock resistance, and, furthermore, have very good heat durability so that one can cope therewith with the rise in molding temperature as resulting from the recent trend toward high-speed resin molding, with the repeated heat cycles resulting from recycling of resins, and with the raised processing temperature in the case of engineering plastics, as well as to provide an anti-static agent comprising the copolymer, a thermoplastic resin composition containing the same, an aqueous composition containing the same and a thermoplastic resin laminate containing the same.

Thus, a cation-modified copolymer according to the invention, is a linear copolymer comprising, within the molecule thereof, 95 to 85 mole % of an ethylene structural unit represented by the formula (I) shown below, 0.1 to 10 mole % of an ester structural unit represented by the general formula (II) shown below, 0.1 to 6 mole % of a carboxylic acid structural unit represented by the general formula (III) shown below and 1 to 12 mole % of an amide structural unit represented by the general formula (IV) shown below and having a weight-average molecular weight of 1,000 to 100,000. The structural units may be arranged either regularly or irregularly.

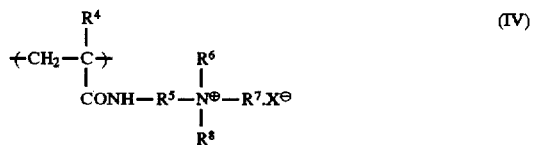

In the above formulas, $R^1$, $R^3$ and $R^4$ each independently is a hydrogen atom or a methyl group, $R^2$ is an alkyl group containing 1 to 4 carbon atoms, $R^5$ is an alkylene group containing 2 to 8 carbon atoms, $R^6$ and $R^7$ each independently is an alkyl group containing 1 to 4 carbon atoms, $R^8$ is an alkyl group containing 1 to 18 carbon atoms or an arylalkyl or aryl group containing 6 to 8 carbon atoms, and $X^-$ is $R^9SO_3^-$ in which $R^9$ is an alkyl group containing 1 to 12 carbon atoms or an arylalkyl or aryl group containing 6 to 18 carbon atoms.

When $R^4$ in the amide structural unit represented by general formula (IV) is a hydrogen atom, the cation-modified copolymer defined above is an acrylamide-containing copolymer and, when $R^4$ in the amide structural unit (IV) is a methyl group, the copolymer is a methacrylamide-containing copolymer.

The constitution of the cation-modified copolymer of the present invention is described below in further detail.

In the cation-modified copolymer according to the present invention, the ethylene structural unit represented by formula (I) is contained in the molecule in a proportion of 95 to 85 mole %. When this proportion is below 85 mole %, the relative proportions of the ester structural unit (II) and amide structural unit (IV) become high and, as a result, the compatibility of the copolymer with thermoplastic resins, in particular polyolefins, becomes deteriorated and this leads to deterioration in mechanical properties of the resins. When the proportion of the ethylene structural unit (I) is more than 95 mole %, the antistatic property of the copolymer of the present invention becomes unsatisfactory. From the viewpoint of the balance between the softening point, mechanical properties and antistatic property, the proportion of the ethylene structural unit (I) is preferably within the range of 93 to 88 mole %.

The cation-modified copolymer according to the present invention intramolecularly contains the ester structural unit represented by general formula (II) in a proportion of 0.1 to 10 mole %, as mentioned above. When this proportion exceeds 10 mole %, the copolymer becomes less crystalline and acquires tackiness or stickiness and the antistatic property becomes more dependent on the humidity. Furthermore, the mechanical properties of polyolefins may be deteriorated upon incorporation of such a copolymer. When the proportion of the ester structural unit (II) is below 0.1 mole %, not only the compatibility of the copolymer with acrylate resins, such as methyl methacrylate resins, and ABS resins, but also the toughness and shock resistance of resins in which the copolymer is incorporated become inferior. From the viewpoint of the softening point and compatibility with resins, the proportion of the ester structural unit (II) is preferably within the range of 0.5 to 6.0 mole %.

In the ester structural unit represented by general formula (II), $R^1$ is a hydrogen atom or a methyl group, and both may be mixedly contained in one and the same copolymer molecule. $R^2$ represents an alkyl group containing 1 to 4 carbon atoms, such as methyl, ethyl, n-propyl, iso-propyl, n-butyl, iso-butyl or tert-butyl, and two or more of these groups may be mixedly contained in one and the same copolymer molecule. For maintaining the softening point of the product cation-modified copolymer, methyl and ethyl are preferred among others.

The cation-modified copolymer of the present invention contains the carboxylic acid structural unit represented by general formula (III) in a proportion of 0.1 to 6 mole %. The presence of the carboxylic acid structural unit offers the advantages outlined below.

The carboxylic acid structural unit (III) inter-molecularly and/or intramolecularly forms an ionic bond with the amide structural unit represented by general formula (IV), whereby the shock resistance and flexibility of resins containing the internally added cation-modified copolymer of the present invention are improved.

In spite of the relatively small molecular weight of the cation-modified copolymer of the present invention, the cation-modified copolymer acquires an apparently increased molecular weight through intermolecular ionic bond formation between the carboxylic acid structural unit (III) and the amide structural unit (IV). Thus, said copolymer shows, during melt kneading with a conventional thermoplastic resin for molding, a viscosity comparable to that of the resin, so that it can be finely dispersed in the resin. As a result, addition, in a small proportion, of the cation-modified copolymer of the present invention brings about a high level of antistatic property.

Furthermore, when the cation-modified copolymer of the invention is used in the form of an aqueous composition for application as a coating agent to substrates such as plastics, glass and paper, the remaining carboxyl groups serve to improve the adhesion, so that the coated thin films become resistant to peeling, hence increasing the durability of their antistatic effect.

When the cation-modified copolymer of the invention contains the carboxylic acid structural unit (III) in a proportion above 6 mole %, the thermoplastic resins internally containing the copolymer become hard or rigid. In addition, the proportion of the amide structural unit (IV) ionically bound to the carboxylic acid structural unit (III) increases and, as a result, the antistatic potential of the copolymer becomes insufficient.

From the viewpoint of antistatic property, shock resistance, flexibility and adhesion, the proportion of the carboxylic acid structural unit (III) is preferably within the range of 0.1 to 5.0 mole %, more preferably 0.1 to 4.2 mole %.

In the carboxylic acid structural unit represented by general formula (III), $R^3$ is a hydrogen atom or a methyl group, and both may be mixedly contained in one and the same copolymer molecule.

The cation-modified copolymer of the present invention contains, within the molecule thereof, the amide structural unit represented by general formula (IV) in a proportion of 1 to 12 mole %. When the proportion is below 1 mole %, the antistatic potential of the copolymer is insufficient. When the proportion exceeds 12 mole %, the copolymer, when incorporated into thermoplastic resins, renders the resins hydroscopic and/or causes deterioration in mechanical properties of the resins due to the resulting decreased compatibility. From the viewpoint of balance among these aspects, the proportion of the amide structural unit (IV) is preferably within the range of 1.2 to 10 mole %.

In the amide structural unit represented by general formula (IV), $R^4$ is a hydrogen atom or a methyl group and both may be contained in one and the same copolymer molecule. From the viewpoint of antistatic effect and coat film flexibility, however, it is desirable that $R^4$ is a hydrogen atom. $R^5$ is an alkylene group containing 2 to 8 carbon atoms, such as ethylene, propylene, hexamethylene or neopentylene, and two or more of these may be mixedly contained in one and the same copolymer molecule. From the viewpoint of ease of production and economy, ethylene and propylene are preferred, and propylene is more preferred.

In the amide structural unit (IV), $R^6$ and $R^7$ each independently represents an alkyl group containing 1 to 4 carbon atoms, such as methyl, ethyl, propyl or butyl, and these groups may be the same or different from one structural unit to another. From the viewpoint of antistatic property endowment, methyl and ethyl are preferred among others.

$R^8$ in the amide structural unit (IV) represents an alkyl group containing 1 to 18 carbon atoms or an arylalkyl or aryl group containing 6 to 8 carbon atoms. Typical examples are methyl, ethyl, n-propyl, iso-propyl, benzyl and the like. Two or more of these may be mixedly contained in one and the same copolymer molecule. From the viewpoint of antistatic property endowment, lower alkyl groups are preferred and, from the viewpoint of heat durability, lower alkyl groups and benzyl are preferred. Particularly preferred are methyl and ethyl.

The counter ion $X^-$ in the quaternary ammonium salt moiety of the amide structural unit (IV) is $R^9SO_3^-$ in which $R^9$ is an alkyl group containing 1 to 12 carbon atoms or an arylalkyl or aryl group containing 6 to 18 carbon atoms. As typical examples of $R^9$, there may be mentioned methyl, ethyl, propyl, phenyl, toluyl, etc. Two or more of these groups may be mixedly contained in one and the same copolymer molecule. From the viewpoint of heat durability, lower alkyl groups, aryl groups and toluyl are preferred.

The copolymer may contain a structural unit represented by the general formula (V)

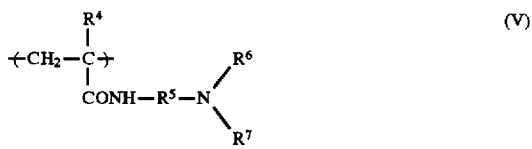

wherein $R^4$, $R^5$, $R^6$ and $R^7$ are as defined above, to an extent to which no problems are encountered from the heat durability viewpoint in the practical use of the copolymer.

The weight-average molecular weight of the cation-modified copolymer having the constitution mentioned above can be determined by gel permeation chromatography. Thus, the weight-average molecular weight expressed in terms of polystyrene equivalent can be determined according to the technique of ultrahigh temperature GPC (Kinugawa et al., "Kobunsi Ronbunshu (Collection of Papers on Macromolecules)", vol. 44, no. 2, pp. 139–141, 1987). The weight-average molecular weight should be within the range of 1,000 to 100,000. A weight-average molecular weight below 1,000 is too small, so that, when incorporated in a thermoplastic resin and heated, the cation-modified copolymer is evaporated by the action of heat. When the weight-average molecular weight is above 100,000, the cation-modified copolymer, when melted, produces an excessively high viscosity, resulting in decreased process-ability. A particularly preferred range of the weight-average molecular weight of the cation-modified copolymer of the present invention is 3,000 to 70,000.

A cation-modified copolymer according to the present invention as claimed in claim 2 is a linear copolymer which comprises 95 to 85 mole % of the ethylene structural unit of formula (I), 0.1 to 10 mole % of the ester structural unit of general formula (II) and 1 to 12 mole % of the amide structural unit of general formula (IV) within the molecule and has a weight-average molecular weight of 1,000 to 100,000. The structural units may be arranged either regularly or irregularly.

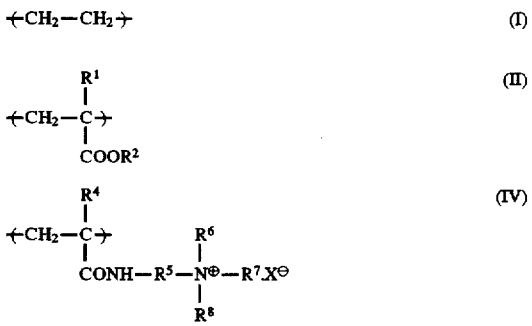

In the above formulas, $R^1$, $R^2$, $R^4$, $R^5$, $R^6$, $R^7$, $R^8$ and $X^-$ are as defined above. The particulars about the respective structural units are as mentioned above.

Good antistatic property can be provided using the cation-modified copolymer of the present invention. Furthermore, said copolymer has good compatibility with thermoplastic resins, causes no decrease in shock resistance and other mechanical properties, and has good heat durability or, in other words, undergoes little discoloration in the step of heating and kneading.

The cation-modified copolymer of the present invention can be produced by the following methods, for instance, although any other properly selected method can also be used. (1) The method which comprises starting with an ethylene-acrylate ester-acrylic acid copolymer and subjecting this copolymer to amidation with a diamine containing a primary amino group and a tertiary amino group combinedly within each molecule, followed by quaternization with an alkylating agent. (2) The method which comprises starting with an oxidized polyethylene wax and ethylene-acrylic acid copolymer and subjecting the same to amidation in the same manner as in the method mentioned above under (1), followed by quaternization and simultaneous esterification using an alkylating agent.

Thus, for instance, in the case (1), the starting resin can be prepared by the method described in JP-A-53057295, JP-A-53065389, JP-A-60079008 or JP-A-60079015, namely by subjecting an ethylene-acrylate ester copolymer to cleavage of molecules and hydrolysis in the presence of water at a temperature of 150° to 500° C. and a reaction pressure of 3 to 500 kg/cm².

This starting resin is dissolved in an inert solvent having a boiling point within the range of 100° to 300° C., for example an aromatic hydrocarbon such as toluene, xylene, cumene or ethyltoluene, an alicyclic hydrocarbon such as methylcyclopentane or ethylcyclohexane, or an aliphatic hydrocarbon such as decane or methylheptane, and then reacted, for amidation, with a diamine such as N,N-dimethylaminoethylamine, N,N-dimethylaminopropylamine, N,N-diethylaminoethylamine or N,N-dimethylaminoneopentylamine. The reaction temperature depends on the boiling point of the solvent employed but, generally, a reaction temperature of 140° to 250° C. is preferred. The progress of the reaction can be followed by collecting the water formed and azeotropically distilled off, and the reaction can be caused to proceed efficiently by removing the water from the reaction system using a Dean-Stark trap or the like.

The amidation product thus obtained can be subjected to quaternization either directly as such or after removal of the reaction solvent using an immiscible solvent, drying and redissolution in an inert solvent. The quaternization reaction can be realized using an alkylating agent of the general formula (VI):

wherein $R^8$ and $R^9$ are as defined above.

As typical alkylating agents, there may be mentioned methyl methanesulfonate, ethyl methanesulfonate, methyl ethanesulfonate, ethyl ethanesulfonate, methyl benzenesulfonate, methyl toluenesulfonate, ethyl toluenesulfonate, methyl dodecylbenzenesulfonate, etc. These alkylating agents may be used either singly or in combination as a mixture of two or more of them.

The quaternization reaction is generally carried out at 70° to 150° C. After addition of the alkylating agent, the reaction mixture is matured at 70° to 150° C. for 1 to 6 hours for completion of the reaction. Thereafter, the solvent is removed and the product is pulverized, or the reaction mixture is poured into an immiscible solvent such as methanol and the resulting precipitate is isolated and then dried, whereby the cation-modified copolymer according to the present invention is obtained.

The cation-modified copolymer of the present invention can be used as an antistatic agent.

An aqueous composition containing the cation-modified copolymer of the present invention is described in the following. The aqueous composition according to the present invention is an aqueous composition comprising the above-mentioned cation-modified copolymer of the present invention as uniformly dispersed in water. When used as a coating agent, this aqueous composition can provide coat films having good conductivity and good adhesion to plastics, glass, paper and other substrate surfaces.

In the present specification, the aqueous composition comprising the copolymer uniformly dispersed in water means any macroscopically uniform system containing the cation-modified copolymer dispersed, emulsified or solubilized, for instance, in water.

Although the method of dispersing, emulsifying or solubilizing the cation-modified copolymer in water is not critical, the high-pressure emulsification method or the like generally employed in producing polyethylene emulsions may be mentioned as an example.

The high-pressure emulsification method comprises charging the cation-modified copolymer of the present invention and water, if necessary together with a surfactant, into a pressure vessel, for example an autoclave, equipped with a stirrer and heating the charge with stirring.

The surfactant is preferably a nonionic or cationic one. Anionic surfactants are undesirable since they form complexes with the cation-modified copolymer, rendering the latter water-insoluble. The cation-modified copolymer to be used in accordance with the present invention in itself has emulsifying ability and, therefore, the use of a surfactant is not always necessary.

The use of the above-mentioned surfactant in a large amount may result in decreased durability and undue tackiness when the aqueous composition obtained is used as a coating agent or the like. Therefore, the surfactant is used generally in an amount of not more than 25 parts by weight, preferably not more than 20 parts by weight, per 100 parts by weight of the cation-modified copolymer.

In general, the heating temperature in the pressure vessel mentioned above is preferably higher by 5° to 20° C. than the temperature at which the cation-modified copolymer melts. A temperature of 60° to 200° C. is thus preferred. Although the heating time may depend on the heating temperature, a period of about 10 minutes to an hour is sufficient. In cases where the heating temperature is unduly low and/or the heating time is unduly short, the resulting composition has poor stability and, thus, precipitation may occur with the lapse of time. An excessively high heating temperature and/or an excessively long heating time is not only economically disadvantageous but also causative of hydrolysis of the cation-modified copolymer.

The proportion of the cation-modified copolymer in the aqueous composition of the present invention is not critical but can be properly adjusted according to the purpose and use of the aqueous composition. Considering the economic and other aspects, the proportion is selected generally within the range of 5 to 40% by weight, preferably 10 to 30% by weight.

The aqueous composition of the present invention may contain an antifoam, a thickening agent and other additives each in an appropriate amount.

The thermoplastic resin composition of the present invention is prepared by incorporating the above-mentioned cation-modified copolymer into a thermoplastic resin. Since it contains the above-mentioned cation-modified copolymer, this thermoplastic resin composition has good antistatic property, good compatibility and good mechanical properties.

The thermoplastic resin into which the cation-modified copolymer is to be incorporated includes various thermoplastic resins such as, for example, polyolefin resins, styrenic resins, acrylic resins, polyamides, polyesters, polyethers, polyvinyl halide resins, and polymer alloys derived from two or more of these.

The polyolefin resins are polymers and copolymers derived from a monoene or monoenes containing 2 to 12 carbon atoms and/or a polyene or polyenes and include, for example, polyethylene, polypropylene, and ethylene-propylene random or block copolymers.

The styrenic resins are homopolymers or copolymers of styrene and include, for example, polystyrene, high-impact polystyrene, ABS resins, AS resins, MS resins and SEBS resins.

The acrylic resins are (co)polymers obtained by polymerizing acrylic acid or methacrylic acid, or an acrylate or methacrylate monomer prepared by esterification of acrylic acid or methacrylic acid with a compound containing 1 to 20 carbon atoms and 1 to 8 OH groups per molecule, and include MMA resins, among others.

The polyesters are, typically, macromolecular compounds obtained by polycondensation of a polybasic acid and a polyhydric alcohol or of a hydroxycarboxylic acid, and includes, for example, polyethylene terephthalate, polybutylene terephthlate and polycarbonate.

The polyamides are acid amide bond-containing linear polymers and include, among others, 6,6-nylon and 6-nylon.

Polyethers are polymers whose principal chain comprises ether bond linkages, and include, for example, polyphenylene ether and polyoxymethylene.

The polyvinyl halide resins are (co)polymers of a monomer derived from a monoene and/or polyene containing 2 to 12 carbon atoms by substitution of at least one hydrogen atom with a halogen, and includes, for example, polyvinyl chloride, polyvinylidene chloride, polyvinyl fluoride and polyvinylidene fluoride.

In preparing the thermoplastic resin composition according to the present invention, 3 to 30 parts by weight of the cation-modified copolymer is incorporated into 100 parts by weight of a thermoplastic resin. When the cation-modified copolymer is incorporated in a proportion less than 3 parts by weight, the antistatic effect is unsatisfactory. A proportion exceeding 30 parts by weight deteriorates the physical properties of the resin supplemented with the copolymer and, in addition, is uneconomical.

Compounding of the cation-modified copolymer and thermoplastic resin is carried out using a single-screw or twin-screw extruder, pressure kneader, Banbury mixer or the like. Thus, the composition of the invention can be obtained by kneading the thermoplastic resin and cation-modified copolymer under heating for melting.

The thermoplastic resin composition of the present invention can be molded into shaped articles, films, foams or laminates by injection molding, extrusion molding, blow molding, inflation molding or the like per se known resin molding techniques. Typical uses of the molding products are packaging material for electron devices, trays for delivering electron devices, covers for illuminators, compact disks, magnetic cards, transparent covers for metering instruments, resin bottles, foamed sheets for thermal insulation, parts for office automation equipment including copying machines, facsimile machines and printers, housings of household electric or electronic appliances, food packaging films, resin parts for interior decoration of automobiles, packings, recording sheet media for electrophotography, materials for interior decoration such as carpets and wallpapers, daily necessities such as combs, etc.

On the occasion of molding, additives, such as colorants, fillers, fire retardants, antioxidants, light stabilizers, plasticizers, lubricants, antistatic agents, blowing agents, extenders, reinforcing materials, surface treatment agents, antifungal agents and processability modifiers, may be added, as necessary, to the resin compositions.

The laminate of the present invention comprising a layer of the cation-modified copolymer and a layer of a thermoplastic resin is a film or a molded article composed of a layer of said cation-modified copolymer and a substrate layer of the thermoplastic resin. Since it has the layer of the cation-modified copolymer mentioned above, this laminate is excellent in antistatic property.

As the method of producing said laminate, there may be mentioned: the method comprising melting the above-mentioned cation-modified copolymer and a thermoplastic resin respectively and subjecting the melts to lamination using a coextrusion film-forming apparatus: the method comprising dissolving the cation-modified copolymer in a solvent such as toluene and applying or spraying the solution to or onto the film or molding surface, followed by removal of the solvent: the method comprising applying or spraying the aqueous composition mentioned above to or onto the film or molding surface, followed by drying: and the in-line coating method comprising subjecting the film after application thereto of said aqueous composition to drawing and heat treatment (drying), among others. As the thermoplastic resin to be used in this laminate production, there may be mentioned the various thermoplastic resins mentioned above as useful in preparing thermoplastic resin compositions according to the invention, including polyolefin resins, styrenic resins, acrylic resins, polyamides, polyesters, polyethers, polyvinyl halide resins, and polymer alloys composed of two or more of these resins.

The thermoplastic resins to be used for laminate production according to the invention may contain, as necessary, inorganic particles, organic particles, organic lubricants, antistatic agents, antioxidants, light stabilizers, plasticizers, dyes, pigments, organic macromolecules, etc.

In applying the aqueous composition mentioned above, which normally contains water as the medium, at least one organic solvent, such as an alcohol, cellosolve or N-methylpyrrolidone, may be added to the coating composition to thereby improve the aggregation stability, applicability to the substrate thermoplastic resin, film-forming ability or other properties of the coating composition.

In the practice of the invention, the coating composition may contain, for attaining improved sticking (blocking) tendency, water resistance, solvent resistance and mechanical strength of the applied layer, one or more of such crosslinking agents as methylol- or alkylol-urea type, melamine type, guanamine type, acrylamide type, polyamide type or like type compounds, epoxy compounds, aziridine compounds, blocked polyisocyanates, silane coupling agents, titane coupling agents, zircoaluminate coupling agents, heat- or peroxide-polymerizable or photoreactive vinyl compounds, photosensitive resins and so on. For attaining improved sticking tendency or slipping tendency, the coating composition may contain one or more of such inorganic fine particles as silica, silica sol, alumina, alumina sol, zirconium sol, kaolin, talc, calcium carbonate, titanium oxide, barium salt, carbon black, molybdenum sulfide or antimony oxide sol. Further the coating compositon may contain, as necessary, one or more of such additives as antifoams, applicability modifiers, thickening agents, organic lubricants, organic macro-molecular particles, antioxidants, ultraviolet absorbers, blowing agents, dyes and the like. For improving the characteristics of the coating composition or applied layer, the coating composition may contain one or more polymers other than the above-mentioned cation-modified copolymer.

The thickness of the cation-modified copolymer layer is not critical. Considering the economic as well as antistatic property and other performance characteristics aspects, however, the range of 0.01 to 5 μm is preferred. It is difficult to obtain uniform resin layers having a thickness of less than 0.01 μm. A thickness exceeding 5 μm is not only uneconomical but also possibly causative of a decrease in slipping tendency in the case of films.

The laminate having a layer of the thermoplastic resin composition of the present invention and a thermoplastic resin layer is a laminate composed of a layer of a composition prepared by incorporating the above-mentioned cation-modified copolymer into a thermoplastic resin and a substrate layer of the thermoplastic resin mentioned above. Since it has a layer containing the above-mentioned cation-modified copolymer, this laminate has good antistatic property. The proportion of the cation-modified copolymer in said thermoplastic resin composition is the same as in the thermoplastic resin composition mentioned hereinabove.

As the thermoplastic resin, there may be mentioned those various thermoplastic resins mentioned above as usable in the thermoplastic resin composition mentioned hereinabove, thus including polyolefin resins, styrenic resins, acrylic resins, polyamides, polyesters, polyethers, polyvinyl halide resins, and polymer alloys prepared from two or more of these.

In the practice of the present invention, the composition layer and/or substrate layer may contain one or more additives such as inorganic particles, organic particles, lubricants, antistatic agents, antioxidants, light stabilizers, plasticizers, dyes, pigments, organic macromolecules and the like each to an extent to which the objects of the present invention are not prevented from being achieved.

The method of producing the laminate of the present invention is not limited to any particular one. It is possible to obtain the laminate by introducing the thermoplastic resin composition of the invention into an auxiliary extruder and the thermoplastic resin to form the substrate layer into a main extruder and performing the in-tube composite molding, in-die composite molding or melt extrusion laminating procedure.

The laminated film of the present invention may be further subjected to corona discharge treatment at least on one side thereof to thereby increase the wet surface tension and thus improve the adhesion to various water-soluble coating agents. It is also possible to process said film into a composite material by providing it with a coating agent layer and laminating it with one or more of various films, sheets, heat sealant layers and so forth. The thus-obtained composite material can be used as a wrapping or packaging material for various articles. The laminate film of the present invention may also be provided with a metal film layer at least on one side thereof by the technique of vapor deposition and further with a heat sealant layer for use as a wrapping or packaging material for various articles.

DETAILED DESCRIPTION OF PREFERRED EMBODIMENTS

The following examples are illustrative of the present invention but are by no means limitative of the scope of the invention.

EXAMPLE 1

(Production of a Cation-modified Copolymer)

A one-liter four-necked flask equipped with a thermometer, stirrer, dropping funnel and Dean-Stark trap was charged with 400 ml of xylene and 150 g (containing 0.315 mole of carboxyl group) of an ethylene-ethyl acrylate-acrylic acid copolymer (ethylene/ethyl acrylate/acrylic acid=90/3/7 mole %) (starting copolymer) and the charge was heated at 100° C. for uniform dissolution. Then, 30.6 g (0.299 mole) of N,N-dimethylaminopropylamine was charged, the whole charge was heated to 140° C. and the water formed was removed continuously as an azeotrope with xylene. The amidation reaction was further carried out at 140° C. for 20 hours until no more reaction water in the form of an azeotrope was observed. The resulting reaction mixture was cooled to 80° C. and poured into 5 volumes, relative to the reaction mixture, of methanol, the resultant precipitate was collected, washed repeatedly with methanol and then dried under reduced pressure to give an intermediate copolymer. The tertiary amino group introduced into the thus-obtained intermediate co-polymer was quantitated by neutralization titration and found to amount to 1.71 meq/g.

Then, 150 g of the intermediate copolymer was again dissolved in xylene, and 28.3 g of methyl methanesulfonate was added dropwise from the dropping funnel over an hour, during which heat generation was observed but the reaction temperature was maintained at 110° C. with cooling. After completion of the dropping, the reaction mixture was aged at 120° C. for 3 hours for conversion of the tertiary amino group into a quartenary ammonium base. The reaction mixture was poured into methanol, and the resultant precipitate was further washed with methanol and dried under reduced pressure to yield 175 g of an acrylamide-based cation-modified copolymer.

Figure 1:
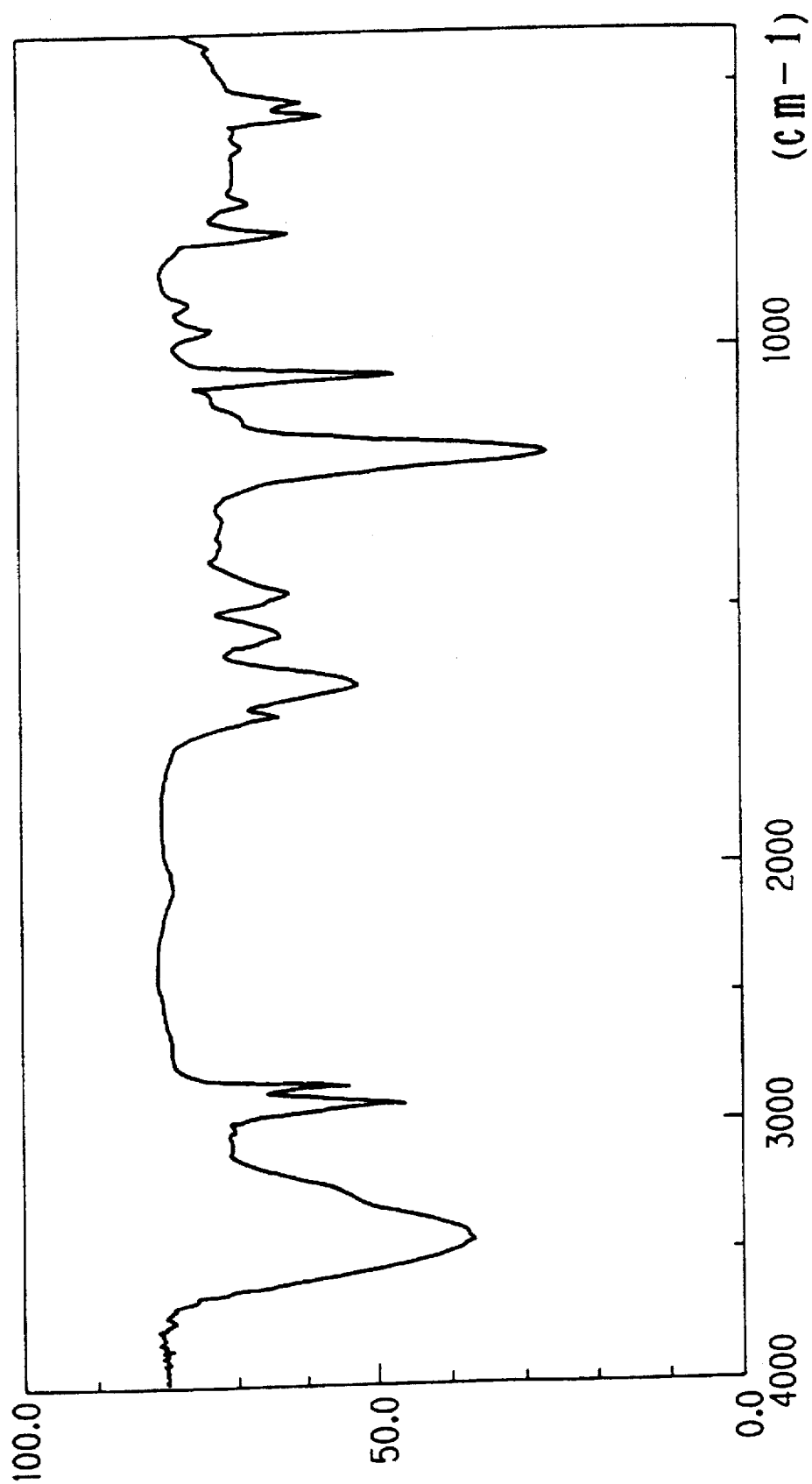
FIG. 1 is an infrared absorption spectrum chart obtained with the acrylamide-based cation-modified copolymer prepared in Example 1.
Figure 2:
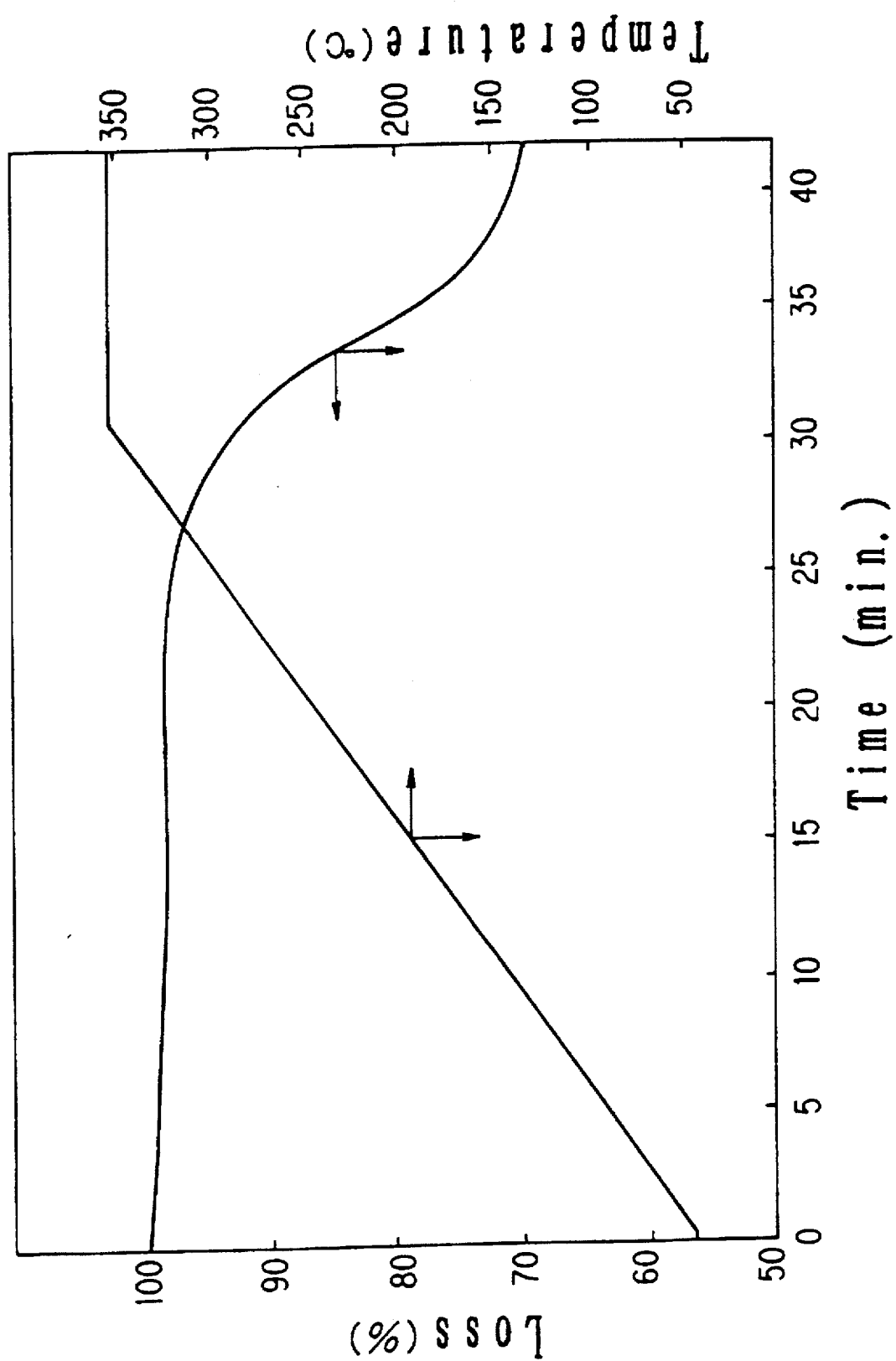
FIG. 2 is a thermogravimetry chart obtained with the acrylamide-based cation-modified copolymer prepared in Example 1.

The thus-obtained cation-modified copolymer was subjected to weight-average molecular weight determination, infrared absorption spectrometry, $^{13}$C-NMR spectrometry and thermogravimetry respectively by the methods mentioned below. The measurement results and the substituents on the amide structural unit (IV) are shown in Table 2. The infrared absorption spectrum is shown in FIG. 1 and the thermogravimetry chart in FIG. 2.

[Weight-average molecular weight determination]

The method described in "Kobunshi Ronbunshu" vol. 44, no. 2, pages 139 to 141 (1987) was essentially followed. The measurement was performed using Waters GPC-244 (column: Showa Denko's Shodex A-80M/S (two columns)) and, as the solvent, 1-chloronaphthalene at a flow rate of 0.7 ml/min. and at a column temperature of 210° C.

[Infrared absorption spectrum measurement]

The measurement was performed by the KBr disk method using a Horiba Seisakusho model FT-200 spectrophotometer.

[$^{13}$C-NMR spectrum measurement]

The measurement was performed at 100° C. using a Nippon Denshi model JMN-GSX 270 spectrometer and deuterated DMSO as the solvent.

[Thermogravimetry]

Thermogravimetry was performed in $N_2$ using a Rigaku model TAS 100 system and raising the temperature from room temperature to 400° C. at a rate of 10° C. per minute and then maintaining the temperature of 400° C. for 10 minutes. The temperature at which thermal decomposition began was determined by the method described in JIS K-7120.

EXAMPLES 2 TO 5

Cation-modified copolymers were prepared in the same manner as in Example 1 using the starting copolymers specified in Table 1 in lieu of the ethylene-ethyl acrylate-acrylic acid copolymer used in Example 1 and using the diamines and alkylating agents specified in Table 1.

The cation-modified copolymers obtained were subjected to infrared absorption spectrometry, $^{13}$C-NMR spectrometry and weight-average molecular weight and thermal decomposition starting temperature determinations. The measurement results and the substituents on the amide structural unit (IV) are shown in Table 2.

COMPARATIVE EXAMPLE 1

Figure 3:
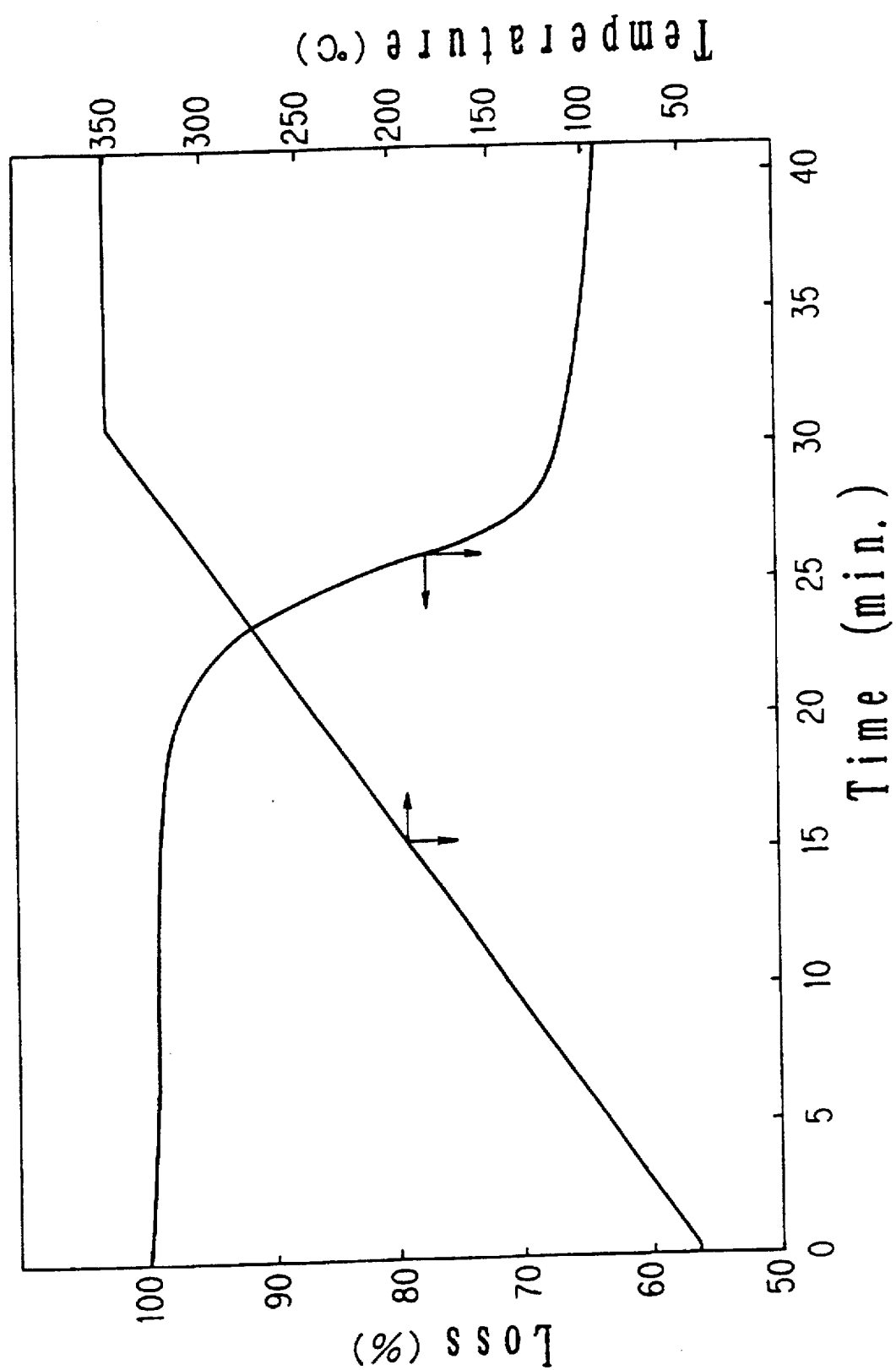
FIG. 3 is a thermogravimetry chart obtained with the cation-modified copolymer prepared in Comparative Example 1.

Using the same reaction apparatus as used in Examples 1 to 5, 150 g (containing 0.315 mole of carboxyl group) of an ethylene-ethyl acrylate-acrylic acid copolymer (ethylene/ethyl acrylate/acrylic acid=90/3/7 mole %, weight-average molecular weight=22,000) was dissolved in 400 ml of xylene, then 32.2 g (0.315 mole) of N,N-dimethylaminopropylamine was added, and the amidation reaction was effected by refluxing the xylene at 140° C. for 17 hours while removing the water formed by the reaction azeotropically. After confirming that no more water-xylene azeotrope was observed, the amidation reaction was completed. The reaction mixture was cooled to 80° C. and, then, 48.6 g of diethyl sulfate was dropped gradually from the dropping funnel over an hour. During the addition, heat generation was observed, so that the reaction temperature was maintained at 90° C. with cooling. After completion of the dropping, the mixture was heated at 100° C. for 4 hours for maturation reaction. The reaction mixture obtained was poured into methanol, and the precipitate was dried under vacuum to give a cation-modified copolymer, having no carboxylic structural unit as shown in Table 2. A thermogravimetry chart obtained therewith is shown in FIG. 3.

TABLE 1

| | Starting copolymer Structural units and contents (mole %) | | | Diamine and amount used (moles per mole of carboxyl group) | Alkylating agent and amount (moles per 100 moles of tertiary amino group) |
|---|---|---|---|---|---|
| | Ethylene | Ester | Carboxylic acid | | |
| Example 1 | 90 | 3 Ethyl acrylate | 7 Acrylic acid | N,N-Dimethylamino propylamine 0.95 | Methyl methanesulfonate 100 |
| Example 2 | 90 | 3 Ethyl acrylate | 7 Acrylic acid | N,N-Dimethylamino propylamine 0.95 | Methyl p-toluenesulfonate 100 |
| Example 3 | 87 | 3 Methyl acrylate | 10 Acrylic acid | N,N-Dimethylamino- propylamine 1.00 | Ethyl methanesulfonate 100 |
| Example 4 | 85 | 6 Methyl methacryate | 9 Methacrylic acid | N,N-Dimethylamino- ethylamine 0.86 | Ethyl p-toluenesulfonate 100 |
| Example 5 | 90 | 0 | 10 Acrylic acid | N,N-Dimethylamino- ethylamine 1.00 | Methyl methanesulfonate 100 |
| Comparative Example 1 | 90 | 3 Ethyl acrylate | 7 Acrylic acid | N,N-Dimethylamino propylamine 1.00 | Diethyl sulfate 100 |

TABLE 2

| | Cation-modified copolymer | | | | | | | | | |
|---|---|---|---|---|---|---|---|---|---|---|
| | Characteristics absorptions in IR absorption spectrum (cm$^{-1}$) | Content (mole %) determined by $^{13}$C-NMR | | | | Amide structural unit (IV) | | | | |
| | | Ester | Carboxylic acid | Amide | Ethylene | $R^5$ | $R^6$ | $R^7$ | $R^8$ | $X^-$ |
| Example 1 | 1730 (acrylate vC=O) 1700 (carboxylic acid vC=O) 1650 (amide vC=O) 1540 (amide vC—N) | 3 | 0.3 | 6.7 | 90 | $(CH_2)_3$ | $-CH_3$ | $-CH_3$ | $-CH_3$ | $CH_3SO_3-$ |
| Example 2 | 1730 (acrylate vC=O) 1700 (carboxylic acid vC=O) 1650 (amide vC=O) 1540 (amide vC—N) 1240 (vS=O) | 3 | 0.3 | 6.7 | 90 | $(CH_2)_3$ | $-CH_3$ | $-CH_3$ | $-CH_3$ |  |
| Example 3 | 1730 (acrylate vC=O) 1650 (amide vC=O) 1540 (amide vC—N) | 3 | 0 | 10 | 87 | $(CH_2)_3$ | $-CH_3$ | $-CH_3$ | $-C_2H_5$ | $CH_3SO_3-$ |
| Example 4 | 1730 (methacrylate vC=O) 1700 (carboxylic acid vC=O) 1650 (amide vC=O) 1540 (amide vC—N) | 6 | 1.3 | 7.7 | 85 | $(CH_2)_2$ | $-CH_3$ | $-CH_3$ | $-C_2H_5$ |  |
| Example 5 | 1730 (acrylate vC=O) 1650 (amide vC=O) 1540 (amide vC—N) | 0.5 | 0 | 9.5 | 90 | $(CH_2)_2$ | $-CH_3$ | $-CH_3$ | $-CH_3$ | $CH_3SO_3-$ |

TABLE 2-continued

| | | | | | | | | | |
|---|---|---|---|---|---|---|---|---|---|
| Comparative Example 1 | 1730 (acrylate $\nu C=O$) 1650 (amide $\nu C=O$) 1540 (amide $\nu C-N$) 1240 ($\nu S=O$) | 3 | 0 | 7 | 90 | $(CH_2)_3$ | $-CH_3$ | $-CH_3$ | $-C_2H_5$ | $C_2H_5-O-SO_3-$ |

| | Cation-modified copolymer Weight-average molecular weight (Mw) | Temperature at which thermal degradation begins (°C.) |
|---|---|---|
| Example 1 | 30,000 | 362 |
| Example 2 | 31,000 | 370 |
| Example 3 | 48,000 | 351 |
| Example 4 | 34,000 | 356 |
| Example 5 | 45,000 | 365 |
| Comparative Example 1 | 31,000 | 263 |

The cation-modified copolymers obtained in Examples 1 to 5 and the copolymer obtained in Comparative Example 1 all had a pale yellow color.

EXAMPLES 6 TO 10

(Preparation of Aqueous Compositions)

Aqueous compositions were prepared using the cation-modified copolymers obtained in Examples 1 to 5, water and, where necessary, a surfactant. The emulsification temperature and emulsification time were as shown in Table 3. The production apparatus used was a model TEM-V-1000 glass autoclave (Taiatsu Garasu Kogyou).

Typical physical characteristics of the aqueous compositions obtained, including the viscosity, particle size and pH were measured by the methods mentioned below. The results are shown in Table 3.

[Viscosity measurement]

Each aqueous composition obtained was allowed to stand in a constant-temperature room maintained at 25° C. for 24 hours and then subjected to viscosity measurement using a BM type viscometer (Tokimec) at 60 rpm (25° C.).

[Particle size measurement]

An Otsuka Denshi model DLS-700 apparatus was used. The measurement and analysis conditions were as follows.

Light source: 5 mW He-Ne laser

Temperature: 25° C.

Measuring angle: 90°

Solvent: water

Method of analysis: histogram method.

[pH measurement]

Each aqueous composition was subjected as such to pH measurement at 25° C.

COMPARATIVE EXAMPLE 2

The cation-modified copolymer obtained in Comparative Example 1 was processed into an aqueous composition in the same manner as in Examples 6 to 10 under the conditions shown in Table 3. The viscosity, particle size and pH of the aqueous composition obtained are shown in Table 3.

TABLE 3

| | Cation-modified copolymer | | Surfactant and amount used (g) | Water (g) | Emulsification temperature (°C.) | Emulsification period (min.) | Viscosity (cp) | Particle size (nm) | pH |
|---|---|---|---|---|---|---|---|---|---|
| | Species | Amount (g) | | | | | | | |
| Example 6 | Example 1 | 50 | — | 450 | 120 | 20 | 51.0 | 87.0 | 4.5 |
| Example 7 | Example 2 | 50 | Nonylphenol-EO adduct 10 | 430 | 115 | 20 | 40.0 | 130.0 | 4.7 |
| Example 8 | Example 3 | 100 | — | 400 | 125 | 20 | 342.0 | 92.4 | 4.1 |
| Example 9 | Example 4 | 100 | 20% Solution of lauryltri-methylammonium chloride 20 | 380 | 120 | 20 | 127.0 | 134.0 | 3.8 |
| Example 10 | Example 5 | 100 | — | 567 | 125 | 20 | 472.0 | 88.7 | 4.3 |
| Comparative Example 2 | Comparative Example 1 | 100 | — | 400 | 115 | 20 | 93.0 | 95.9 | 4.2 |

EXAMPLES 11 TO 15

A blend of 10 parts by weight of one of the cation-modified copolymers obtained in Examples 1 to 5 and 90 parts by weight of polypropylene (Tokuyama UP polypropylene ME-230) was pelletized by melt-kneading in a twin-screw extruder equipped with a constant flow feeder and heated at 20° C. The pellets were molded into test pieces using an injection molding machine and the test pieces were tested for various physical properties by the respective methods mentioned below. The results obtained are shown in Table 4.

[Specific surface resistance (surface resistivity)]
(1) Specific surface resistance value mer obtained in Comparative Example 1 was used. The test pieces were subjected to various physical property measurements. The results obtained are shown in Table 4.

TABLE 4

| | Cation-modified copolymer | Specific surface resistance (Ω) | | | | Charge attenuation rate (sec.) | Thermal aging (days) |
|---|---|---|---|---|---|---|---|
| | | 24 hours (1) | | after 30 days (2) | washing with water (3) | | |
| | | 20° C. 30% RH | 20° C. 60% RH | 20° C. 60% RH | 20° C. 60% RH | | |
| Example 11 | Example 1 | $1.4 \times 10^{11}$ | $7.2 \times 10^{10}$ | $7.0 \times 10^{10}$ | $6.8 \times 10^{10}$ | <4 | 6 |
| Example 12 | Example 2 | $1.7 \times 10^{11}$ | $5.7 \times 10^{10}$ | $6.1 \times 10^{10}$ | $5.5 \times 10^{10}$ | <1 | 7 |
| Example 13 | Example 3 | $4.9 \times 10^{11}$ | $1.8 \times 10^{11}$ | $2.3 \times 10^{11}$ | $1.5 \times 10^{11}$ | <1 | 7 |
| Example 14 | Example 4 | $4.0 \times 10^{11}$ | $7.6 \times 10^{10}$ | $1.0 \times 10^{11}$ | $8.2 \times 10^{10}$ | <1 | 6 |
| Example 15 | Example 5 | $7.2 \times 10^{10}$ | $5.5 \times 10^{10}$ | $4.3 \times 10^{10}$ | $5.1 \times 10^{10}$ | 3 | 7 |
| Comparative Example 3 | — | $9.1 \times 10^{16}$ | $8.5 \times 10^{16}$ | $7.3 \times 10^{16}$ | $9.7 \times 10^{16}$ | >3000 | 7 |
| Comparative Example 4 | Comparative Example 1 | $1.8 \times 10^{13}$ | $8.8 \times 10^{12}$ | $9.0 \times 10^{12}$ | $8.6 \times 10^{12}$ | 10 | 1 |

Test pieces were allowed to stand under conditions of 20° C. and 30% RH (relative humidity) or 20° C. and 60% RH for 24 hours and then subjected to specific surface resistance value measurement at an applied voltage of 500 V using an Advantest model R8340 apparatus.

(2) Durability

Test pieces were stored at room temperature for 30 days, then allowed to stand under conditions of 20° C. and 60% RH for 24 hours and subjected to specific surface resistance value measurement in the same manner as mentioned above under (1).

(3) Water resistance

Test pieces were aged in an oven maintained at 40° C. for 14 days, and the surface thereof was then thoroughly washed with an aqueous solution of Mama Lemon (Lion Corp.) employed as a detergent and thoroughly rinsed with deionized water. The test pieces were then allowed to stand under conditions of 20° C. and 60% RH for 24 hours and subjected to specific surface resistance value measurement in the same manner as mentioned above under (1).

[Charge attenuation rate]

Using a static honestometer (Shishido Shokai), a voltage of 10.000 V was applied to each test piece for 30 seconds, and the time required for reduction to half of the initial voltage was measured and expressed in terms of seconds.

[Thermal aging]

JIS K-7212 was followed. The extent of discoloration was determined by visual observation and the number of days after which unquestionable discoloration was observed was employed as an index. The testing temperature was 150° C.

COMPARATIVE EXAMPLE 3

Test pieces were prepared in the same manner as in Examples 11 to 15 except that no cation-modified copolymer was added and the polypropylene alone was used. The test pieces were subjected to various physical property measurements. The results obtained are shown in Table 4.

COMPARATIVE EXAMPLE 4

Test pieces were prepared in the same manner as in Examples 11 to 15 except that the cation-modified copoly- As seen in Table 4, the test pieces obtained from the compositions prepared by incorporating one of the cation-modified copolymers of Examples 1 to 5 were superior in antistatic property, durability and water resistance to those obtained from the composition containing the copolymer of Comparative Example 1 or from polypropylene alone. The test pieces from the composition containing the copolymer of Comparative Example 1 was markedly inferior in thermal aging to the other test pieces.

EXAMPLES 16 AND 17

A blend of 10 parts by weight of the cation-modified copolymer obtained in Example 1 or 2 and 90 parts by weight of polypropylene (Tokuyama UP polypropylene ME-230) was pelletized by melt-heading in a twin-screw extruder equipped with a constant flow feeder and heated at a varied kneading temperature of 200° to 280° C. The pellets were molded into test pieces using an injection molding machine and subjected to various physical property measurements by the methods mentioned below. The results thus obtained are shown in Table 5.

[Specific surface resistance]

Test pieces were allowed to stand under conditions of 20° C. and 60% RH for 24 hours and then they were subjected to specific surface resistance value measurement at an applied voltage of 500 V using an Advantest model R8340 apparatus.

[Hue]

The degree of yellowing was determined according to JIS K-7103 (reflection method) using a Nippon Denshoku Kogyo model Z-1001DP colorimeter. The difference in the degree of yellowing was calculated as follows:

$$\alpha YI = YI - YI_0$$

where YI=the degree of yellowing of a test piece molded from pellets obtained from the extruder, and $YI_0$=the degree of yellowing of a test piece obtained by injection molding of polypropylene.

COMPARATIVE EXAMPLE 5

Tests were performed in the same manner as in Examples 16 using the copolymer obtained in Comparative Example 1. The results obtained are shown in Table 5.

TABLE 5

|  | Cation-modified copolymer | Kneading temperature (°C.) | Specific surface resistance (Ω) | ΔYI |
|---|---|---|---|---|
| Example 16 | Example 1 | 200 | $7.0 \times 10^{10}$ | 2 |
|  |  | 220 | $6.2 \times 10^{10}$ | 3 |
|  |  | 240 | $7.6 \times 10^{10}$ | 2 |
|  |  | 260 | $7.9 \times 10^{10}$ | 4 |
|  |  | 280 | $7.6 \times 10^{10}$ | 5 |
|  |  | 200 | $6.1 \times 10^{10}$ | 3 |
|  |  | 220 | $7.0 \times 10^{10}$ | 3 |
| Example 17 | Example 2 | 240 | $6.5 \times 10^{10}$ | 3 |
|  |  | 260 | $7.1 \times 10^{10}$ | 5 |
|  |  | 280 | $6.7 \times 10^{10}$ | 6 |
|  |  | 200 | $9.0 \times 10^{12}$ | 5 |
|  |  | 220 | $7.5 \times 10^{12}$ | 10 |
| Comparative Example 5 | Comparative Example 1 | 240 | $6.9 \times 10^{12}$ | 10 |
|  |  | 260 | $9.8 \times 10^{15}$ | 43 |
|  |  | 280 | $1.0 \times 10^{16}$ | 46 |

EXAMPLE 18

(Changes in Specific Surface Resistance and Hue Upon Repeated Use of Resin)

Pellets were prepared in the same manner as in Example 16 using the cation-modified copolymer of Example 1 and injection-molded into test pieces at 240° C. (number of repetitions=0). After specific surface resistance and hue measurements, the test pieces were broken into pieces and again injection-molded into test pieces at 230° C. (number of repetitions=1). The test pieces were measured for specific surface resistance and hue. Thereafter, the above procedure was repeated. The results thus obtained are shown in Table 6.

COMPARATIVE EXAMPLE 6

Tests were performed in the same manner as in Example 18 using the copolymer obtained in Comparative Example 1. The results are shown in Table 6.

TABLE 6

|  | Example 18 | | Comparative Example 6 | |
|---|---|---|---|---|
| Number of repetitions | Specific surface resistance (Ω) | ΔYI | Specific surface resistance (Ω) | ΔYI |
| 0 | $6.5 \times 10^{10}$ | 2 | $6.8 \times 10^{12}$ | 10 |
| 1 | $6.7 \times 10^{10}$ | 3 | $7.9 \times 10^{12}$ | 15 |
| 2 | $7.1 \times 10^{10}$ | 3 | $9.8 \times 10^{13}$ | 16 |
| 3 | $6.9 \times 10^{10}$ | 4 | $1.0 \times 10^{14}$ | 37 |
| 4 | $7.3 \times 10^{10}$ | 3 | $5.8 \times 10^{14}$ | 49 |
| 5 | $7.4 \times 10^{10}$ | 3 | $2.3 \times 10^{16}$ | 56 |
| 6 | $6.8 \times 10^{10}$ | 4 | $5.9 \times 10^{16}$ | 63 |
| 7 | $6.9 \times 10^{10}$ | 4 | $6.1 \times 10^{16}$ | 68 |

EXAMPLE 19 AND COMPARATIVE EXAMPLE 7

(Retention Test Injection Molding Machine)

Pellets were prepared in the same manner as in Example 16 using the cation-modified copolymer of Example 2 or Comparative Example 1. Test pieces (before standing) were prepared by injection-molding a portion of the pellets at 240° C. The heating cylinder of the injection molding machine was filled with the remaining pellets, which were then allowed to stand there at 240° C. for 2 hours and, thereafter, injection-molded into test pieces (after standing). The test pieces before standing and the test pieces after standing were measured for specific surface resistance and hue. The results obtained are shown in Table 7.

TABLE 7

|  | Example 19 | | Comparative Example 7 | |
|---|---|---|---|---|
|  | Specific surface resistance (Ω) | ΔYI | Specific surface resistance (Ω) | ΔYI |
| Before standing | $6.8 \times 10^{10}$ | 2 | $6.5 \times 10^{12}$ | 10 |
| After standing | $7.5 \times 10^{10}$ | 3 | $3.5 \times 10^{16}$ | 52 |

EXAMPLES 20 TO 31

Using the thermoplastic resins listed in Table 8 in lieu of the polypropylene resin used in Example 12, test pieces were prepared in the same manner as in Example 12 according to the respective recipes given in Table 9 and under the temperature conditions shown in Table 9. The test pieces were subjected to the same physical property measurements as in Examples 11 to 15. The results are also shown in table 9.

The thermal aging test temperature was 120° C. for HDPE, 90° C. for HIPS, 90° C. for ABS, 200° C. for PBT, 90° C. for MMA, 130° C. for PA, 140° C. for PC, 120° C. for PPO, 150° C. for PVDF, 120° C. for PC/ABS, 120° C. for PA/ABS and 120° C. for PBT/ABS.

COMPARATIVE EXAMPLES 8 to 19

Test pieces for Comparative Examples 8 to 19 were prepared in the same manner as in Examples 20 to 31 except that the product copolymer of Comparative Example 1 was used as the cation-modified copolymer. The test pieces were tested for typical physical characteristics in the same manner as in Examples 11 to 15. The test results are shown in Table 10.

TABLE 8

|  | Abbreviation | Manufacturer | Trade name |
|---|---|---|---|
| High-density polyethylene | HDPE | Showa Denko | Ace polyethylene HD5110 |
| High-impact polystyrene | HIPS | Nippon Steel Chemical | Estyrene H65 |
| ABS resin | ABS | Ube Cycon | Cycolac T |
| Polybutylene terephthalate | PBT | Toray Industries | Toyolac 1401-X06 |
| MMA resin | MMA | Sumitomo Chemical | Sumipex MH |
| Polyamide | PA | Asahi Chemical Industry | Leona 1300S |
| Polycarbonate | PC | Idemitsu Petro-Chemical | Touflon A2200 |
| Polyphenylene ether | PPO | Asahi Chemical Industry | Xylon 500V |
| Polyvinylidene fluoride | PVDF | Mitsubishi Chemical | Kynar 720 |
| Polycarbonate/ABS | PC/ABS | Daicel Chemical Industries | Novalloy S1220 |
| Polyamide/ABS | PA/ABS | Toray Industries | Toyolac Alloy SX01 |
| Polybutylene terephthalate/ABS | PBT/ABS | Japan Synthetic Rubber | JSR Maskloy BK102 |

TABLE 9

| | Thermoplastic resin | | Cation-modified copolymer | | Processing temperature (°C.) | Specific surface resistance (Ω) | | | | Charge attenuation rate (sec.) | Thermal aging (days) |
|---|---|---|---|---|---|---|---|---|---|---|---|
| | | | | | | after 24 hours | | after 30 days | after washing water | | |
| | Species | Weight parts | Species | Weight parts | | 20° C. 30% RH | 20° C. 60% RH | 20° C. 60% RH | 20° C. 60% RH | | |
| Example 20 | HDPE | 90 | Example 2 | 10 | 200 | $3.2 \times 10^{11}$ | $2.1 \times 10^{11}$ | $9.0 \times 10^{10}$ | $9.2 \times 10^{10}$ | 1< | 7 |
| Example 21 | HIPS | 90 | Example 2 | 10 | 210 | $5.1 \times 10^{10}$ | $3.6 \times 10^{10}$ | $4.0 \times 10^{10}$ | $3.8 \times 10^{10}$ | 1< | 7 |
| Example 22 | ABS | 85 | Example 2 | 15 | 220 | $4.0 \times 10^{11}$ | $9.9 \times 10^{10}$ | $9.0 \times 10^{10}$ | $8.8 \times 10^{10}$ | 1< | 7 |
| Example 23 | PBT | 85 | Example 2 | 15 | 230 | $4.5 \times 10^{10}$ | $2.0 \times 10^{10}$ | $1.9 \times 10^{10}$ | $2.2 \times 10^{10}$ | 1< | 6 |
| Example 24 | MMA | 90 | Example 2 | 10 | 220 | $4.2 \times 10^{10}$ | $1.2 \times 10^{10}$ | $2.0 \times 10^{10}$ | $1.8 \times 10^{10}$ | 1< | 7 |
| Example 25 | PA | 90 | Example 2 | 10 | 280 | $3.5 \times 10^{9}$ | $2.1 \times 10^{9}$ | $3.0 \times 10^{9}$ | $2.4 \times 10^{9}$ | 1< | 5 |
| Example 26 | PC | 90 | Exatnple 2 | 10 | 280 | $8.5 \times 10^{11}$ | $4.3 \times 10^{11}$ | $5.0 \times 10^{11}$ | $4.3 \times 10^{11}$ | 1< | 5 |
| Example 27 | PPO | 90 | Example 2 | 10 | 280 | $6.8 \times 10^{12}$ | $1.0 \times 10^{12}$ | $8.5 \times 10^{11}$ | $8.8 \times 10^{11}$ | 1< | 5 |
| Example 28 | PVDF | 90 | Example 2 | 10 | 250 | $6.7 \times 10^{11}$ | $3.1 \times 10^{11}$ | $3.0 \times 10^{11}$ | $2.8 \times 10^{11}$ | 1< | 7 |
| Example 29 | PC/ABS | 90 | Example 2 | 10 | 260 | $3.4 \times 10^{12}$ | $1.0 \times 10^{12}$ | $8.9 \times 10^{11}$ | $8.5 \times 10^{11}$ | 1< | 8 |
| Example 30 | PA/ABS | 90 | Example 2 | 10 | 260 | $7.6 \times 10^{10}$ | $4.3 \times 10^{10}$ | $4.8 \times 10^{10}$ | $4.0 \times 10^{10}$ | 1< | 7 |
| Example 31 | PBT/ABS | 90 | Example 2 | 10 | 260 | $6.5 \times 10^{11}$ | $3.6 \times 10^{11}$ | $2.8 \times 10^{11}$ | $2.6 \times 10^{11}$ | 1< | 5 |

TABLE 10

| | Thermoplastic resin | | Cation-modified copolymer | | Processing temperature (°C.) | Specific surface resistance (Ω) | | | | Charge attenuation rate (sec.) | Thermal aging (days) |
|---|---|---|---|---|---|---|---|---|---|---|---|
| | | | | | | after 24 hours | | after 30 days | after washing water | | |
| | Species | Weight parts | Species | Weight parts | | 20° C. 30% RH | 20° C. 60% RH | 20° C. 60% RH | 20° C. 60% RH | | |
| Comparative Example 8 | HDPE | 90 | Comparative Example 1 | 10 | 200 | $9.8 \times 10^{11}$ | $5.6 \times 10^{11}$ | $6.9 \times 10^{11}$ | $5.5 \times 10^{11}$ | 3.0 | 1 |
| Comparative Example 9 | HIPS | 90 | Comparative Example 1 | 10 | 210 | $8.6 \times 10^{10}$ | $5.1 \times 10^{10}$ | $6.9 \times 10^{10}$ | $5.5 \times 10^{10}$ | 1< | 1 |
| Comparative Example 10 | ABS | 85 | Comparative Example 1 | 15 | 220 | $6.6 \times 10^{11}$ | $3.5 \times 10^{11}$ | $3.2 \times 10^{11}$ | $3.8 \times 10^{11}$ | 1< | 1 |
| Comparative Example 11 | PBT | 85 | Comparative Example 1 | 15 | 230 | $1.0 \times 10^{11}$ | $5.5 \times 10^{10}$ | $6.0 \times 10^{10}$ | $5.2 \times 10^{10}$ | 1< | 1 |
| Comparative Example 12 | MMA | 90 | Comparative Example 1 | 10 | 220 | $2.5 \times 10^{11}$ | $1.8 \times 10^{10}$ | $2.5 \times 10^{10}$ | $1.4 \times 10^{10}$ | 1< | 5 |
| Comparative Example 13 | PA | 90 | Comparative Example 1 | 10 | 280 | Foaming/decomposition | | | | | |
| Comparative Example 14 | PC | 90 | Comparative Example 1 | 10 | 280 | Forming/decomposition | | | | | |
| Comparative Example 15 | PPO | 90 | Comparative Example 1 | 10 | 280 | Forming/decomposition | | | | | |
| Comparative Example 16 | PVDF | 90 | Comparative Example 1 | 10 | 250 | $9.8 \times 10^{12}$ | $5.4 \times 10^{11}$ | $4.6 \times 10^{11}$ | $3.5 \times 10^{11}$ | 1< | 1 |
| Comparative Example 17 | PC/ABS | 90 | Comparative Example 1 | 10 | 260 | Forming/decomposition | | | | | |
| Comparative Example 18 | PA/ABS | 90 | Comparative Example 1 | 10 | 260 | Forming/decomposition | | | | | |
| Comparative Example 19 | PBT/ABS | 90 | Comparative Example 1 | 10 | 260 | Forming/decomposition | | | | | |

As is clear from the results shown in Tables 9 and 10, the moldings of Examples 20 to 31 in which the cation-modified copolymer of Example 2 was used were superior in antistatic property as well as in durability of antistatic property and water resistance to the moldings of Comparative Examples 8 to 19 in which the copolymer of Comparative Example 1 was incorporated. The moldings of Examples 20 to 31 gave better thermal aging results as compared with the corresponding moldings of Comparative Examples 8 to 19.

EXAMPLE 32

The aqueous composition obtained in Example 6 was applied to a 50-μm-thick polyethylene terephthalate (PET; Mitsubishi Chemical's Dianite KR461S) film to a coating weight of 2.0 g/m² using a bar coater, followed by drying. Typical physical properties of the thus-obtained conductive PET film are shown in Table 11.

TABLE 11

| Specific surface resistance (Ω) | | | | |
|---|---|---|---|---|
| 24 hours | | after 30 days | washing with water | |
| 20° C. 30% RH | 20° C. 60% RH | 20° C. 60% RH | 20° C. 60% RH | Transparency |
| $5.1 \times 10^6$ | $1.0 \times 10^8$ | $1.6 \times 10^8$ | $1.5 \times 10^6$ | No problem |

EXAMPLE 33

A blend of 90 parts by weight of low-density polyethylene (Ube Industries' UBE polyethylene F022) and 10 parts by weight of the cation-modified copolymer obtained in Example 1 was introduced into a T-die type film extruder heated at 200° to 210° C. and molded into an unstretched film having a thickness of 50 μm and a width of 500 mm. Pieces, 10 cm×10 cm in size, were cut out from the film obtained and used as test film pieces.

The thus-obtained film pieces were examined for specific surface resistance, antiblocking property, transparency, tensile strength and elongation by the methods mentioned below. The results obtained are shown in Table 12.

[Specific surface resistance]
(1) Specific surface resistance value

Specific surface resistance values were measured in the same manner as in Examples 11 to 15 mentioned above.
(2) Durability and water resistance Durability and water resistance measurements were performed in the same manner as in Examples 11 to 15 mentioned above.

[Antiblocking property]

Two of the test film pieces mentioned above were sandwiched between two glass plates (20 cm×20 cm), placed in an oven maintained at 40° C. and aged for 14 days. After the 14-day period, the film pieces were taken out of the oven, peeled off from each other and examined for blocking. The evaluation criteria were as follows:

о: No blocking;
x: Blocking observed.

[Transparency]

The transparency of the test pieces was evaluated by the naked eye. The evaluation criteria were as follows:

о: Good transparency;
x: Transparency not complete.

[Tensile strength and elongation]

The test film pieces were cut to a size of 10 mm in width and 100 mm in length, and the thickness (T in mm) was measured. The test pieces thus cut out were mounted on a Tenslion-type tensile tester with the chuck-to-chuck distance adjusted to 50 mm, and drawn at a rate of 300 mm/min. The breaking strength (S) and breaking extension (s) were measured, and the tensile strength and elongation were calculated as follows:

Tensile strength (kg/mm$^2$)=S (kg)/10 (mm)·T (mm)

Elongation (%)=(s (mm)/50 (mm))×100

TABLE 12

| Specific surface resistance (Ω) | | | | Blocking resistance | Transparency | Mechanical properties | |
|---|---|---|---|---|---|---|---|
| 24 hours | | after 30 days | washing with water | | | Tensile strength | Elongation |
| 20° C. 30% RH | 20° C. 60% RH | 20° C. 60% RH | 20° C. 60% RH | | | (kg/mm$^2$) | (%) |
| $1.3 \times 10^{11}$ | $9.5 \times 10^{10}$ | $1.0 \times 10^{11}$ | $9.0 \times 10^{10}$ | о | о | 1.8 | 650 |

EXAMPLE 34

Ten (10) parts by weight of the cation-modified copolymer of Example 2 and 90 parts by weight of polypropylene (Sumitomo Chemical's Noblen FK145) were dry-blended and then processed in an extrusion molding machine at 200° to 210° C. to give a resin composition for lamination. The polypropylene mentioned above was introduced into a main extruder and the resin composition for lamination into an auxiliary extruder, at 200° to 210° C., and both charges were then introduced into a coextrusion fill producing machine equipped with an in-tube composite forming device, coextruded at 200° to 210° C. and biaxially stretched (5 times longitudinally and 7 times transversely) at 150° C. to give a 100-μm-thick film. The thickness of the polypropylene layer was 75 μm, and that of the layer of the resin composition for lamination was 25 μm. The laminated film was tested in the same manner as in Example 33. The test results are shown in Table 13.

TABLE 13

| Specific surface resistance (Ω) | | | | Blocking resistance | Transparency | Mechanical properties | |
|---|---|---|---|---|---|---|---|
| 24 hours | | after 30 days | washing with water | | | Tensile strength (kg/mm$^2$) | Elongation (%) |
| 20° C. 30% RH | 20° C. 60% RH | 20° C. 60% RH | 20° C. 60% RH | | | | |
| $4.0 \times 10^{11}$ | $1.8 \times 10^{11}$ | $1.7 \times 10^{11}$ | $1.6 \times 10^{11}$ | ○ | ○ | 3.5 | 450 |

EXAMPLE 35

Polypropylene (melt index: 2.5 g/10 min.) was melt-extruded using a T-die extruder to give an unstretched film having a thickness of 900 μm. This was stretched 5 times longitudinally at a temperature of 130° C. and then coated with the aqueous composition obtained in Example 6 to a thickness of 25 μm by the gravure coating technique. The coated film was further stretched 9 times transversely at 160° C. to give a conductive OPP (oriented polypropylene) film. The aqueous composition layer on this film had a thickness of 2.8 μm (wet film thickness) and the film had a thickness of 20 μm. The specific surface resistance characteristics of this conductive OPP film were as shown in Table 14 and it was revealed that said film had good antistatic property.

Two test pieces cut out from said conductive OPP film were put together in the coated face-to-coated face manner and allowed to stand at 40° C. and 80% RH for a week, then peeled off from each other and examined for the state of the coated surfaces. No sticking or blocking was observed.

Furthermore, printing was made on the coated surface of the conductive OPP film using a printing ink for polypropylene, whereupon good printability was revealed.

EXAMPLE 36

A coating composition was prepared by mixing 20 parts by weight of the aqueous composition obtained in Example 6 with 80 parts by weight of an ethylene-vinyl acetate emulsion (resin solids: 35% by weight). This coating composition was applied to a low-density polyethylene (melt index: 3.0 g/10 min.) film to a thickness (wet) of 1 μm using a blade coater and then dried to give a conductive film.

Thus was obtained a film excellent in antistatic property, as shown in Table 15.

TABLE 14

| Specific surface resistance (Ω) | | | |
|---|---|---|---|
| 24 hours | | after 30 days | washing with water |
| 20° C. 30% RH | 20° C. 60% RH | 20° C. 60% RH | 20° C. % RH |
| $6.8 \times 10^8$ | $1.5 \times 10^8$ | $1.3 \times 10^8$ | $1.4 \times 10^8$ |

TABLE 15

| Specific surface resistance (Ω) | | | |
|---|---|---|---|
| 24 hours | | after 30 days | washing with water |
| 20° C. 30% RH | 20° C. 60% RH | 20° C. 60% RH | 20° C. % RH |
| $7.5 \times 10^{11}$ | $1.0 \times 10^{11}$ | $1.8 \times 10^{11}$ | $1.5 \times 10^{11}$ |

EXAMPLE 37

The cation-modified copolymer obtained in Example 1 was dissolved in toluene with heating to give a concentration of 10% by weight, followed by cooling. The thus-obtained coating composition was applied to a 50-μm-thick polyethylene terephthalate (PET; Mitsubishi Chemical's Dianite KR461S) to a coat weight of 2.0 g/m² using a bar coater and then dried for removing the toluene, to give a conductive PET film. Typical physical characteristics of this film are shown in Table 16.

TABLE 16

| Specific surface resistance (Ω) | | | | | |
|---|---|---|---|---|---|
| 24 hours | | 30 days | after washing with water | Blocking resistance | Transparency |
| 20° C. 30% RH | 20° C. 60% RH | 20° C. 60% RH | 20° C. % RH | | |
| $3.0 \times 10^{8}$ | $7.5 \times 10^{7}$ | $9.0 \times 10^{7}$ | $8.0 \times 10^{7}$ | ○ | ○ |

EXAMPLE 38

Ninety (90) parts by weight of polypropylene (melt index: 2.5 g/10 min.) was introduced into a main extruder and 10 parts by weight of the cation-modified copolymer obtained in Example 1, at 200° to 210° C. Both charges were then introduced into a coextrusion film producing machine equipped with an in-tube composite forming device and coextruded at 200° to 210° C., followed by biaxial strethcing at 150° C. (5 times longitudinally and 7 times transversely), to give a 100-μm-thick film. The polypropylene layer had a thickness of 90 μm and the cation-modified copolymer layer had a thickness of 10 μm. The thus-obtained laminated film was tested in the same manner as in Example 33. The test results are shown in Table 17.

EXAMPLE 39

Ten (10) parts by weight of the cation-modified copolymer of Example 2 and 90 parts by weight of low-density polyethylene (Mitsui Petrochemical's Mirason 151) were dry-blended and processed in an extrusion molding machine at 200° to 210° C. to yield a resin composition for lamination. The above-mentioned low-density polyethylene was introduced into a main extruder, and the resin composition prepared for lamination was introduced into an auxiliary extruder, at 150° to 160° C., and both charges were then introduced into a coextrusion film producing machine equipped with an in-tube composite forming device, coextruded at 160° C. and passed through a chill roll maintained at 20° C. to give a 100-μm-thick film. The low-density polyethylene layer had a thickness of 75 μm and the layer of the resin composition for lamination had a thickness of 25 μm. The laminated film obtained was tested in the same manner as in Example 33. The test results are shown in Table 18.

TABLE 17

| Specific surface resistance (Ω) | | | | | | Mechanical properties | |
|---|---|---|---|---|---|---|---|
| 24 hours | | after 30 days | washing with water | Blocking resistance | Transparency | Tensile strength (kg/mm²) | Elongation (%) |
| 20° C. 30% RH | 20° C. 60% RH | 20° C. 60% RH | 20° C. 60% RH | | | | |
| $1.5 \times 10^{9}$ | $1.2 \times 10^{9}$ | $1.5 \times 10^{9}$ | $1.0 \times 10^{9}$ | ○ | ○ | 3.9 | 430 |

TABLE 18

| Specific surface resistance (Ω) | | | | Blocking resistance | Transparency | Mechanical properties | |
|---|---|---|---|---|---|---|---|
| 24 hours | | after 30 days | washing with water | | | Tensile strength | Elongation |
| 20° C. 30% RH | 20° C. 60% RH | 20° C. 60% RH | 20° C. 60% RH | | | (kg/mm²) | (%) |
| $1.8 \times 10^{12}$ | $7.5 \times 10^{11}$ | $6.0 \times 10^{11}$ | $5.2 \times 10^{11}$ | ○ | ○ | 86 | 630 |

What is claimed is:

1. A cation-modified linear copolymer which comprises, within the molecule thereof, 95 to 85 mole percent of an ethylene structural unit represented by the formula (I), 0.1 to 10 mole percent of an ester structural unit represented by the general formula (II), 0.1 to 6 mole percent of a carboxylic acid structural unit represented by the general formula (III) and 1 to 12 mole percent of an amide structural unit represented by the general formula (IV):

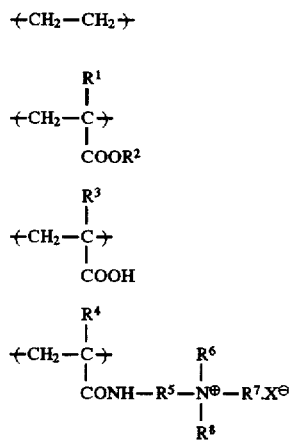

wherein, in the above formulas, $R^1$, $R^3$ and $R^4$ each independently represents a hydrogen atom or a methyl group, $R^2$ represents an alkyl group containing 1 to 4 carbon atoms, $R^5$ represents an alkylene group containing 2 to 8 carbon atoms, $R^6$ and $R^7$ each independently represents an alkyl group containing 1 to 4 carbon atoms, $R^8$ represents an alkyl group containing 1 to 18 carbon atoms or an arylalkyl or aryl group containing 6 to 8 carbon atoms, and $X^-$ represents $R^9SO_3^-$ in which $R^9$ represents an alkyl group containing 1 to 12 carbon atoms or an arylalkyl or aryl group containing 6 to 18 carbon atoms, said copolymer having a weight-average molecular weight of 1,000 to 100,000.

2. A cation-modified linear copolymer which comprises, within the molecule thereof, 95 to 85 mole percent of an ethylene structural unit represented by the formula (I), 0.1 to 10 mole percent of an ester structural unit represented by the general formula (II) and 1 to 12 mole percent of an amide structural unit represented by the general formula (IV):

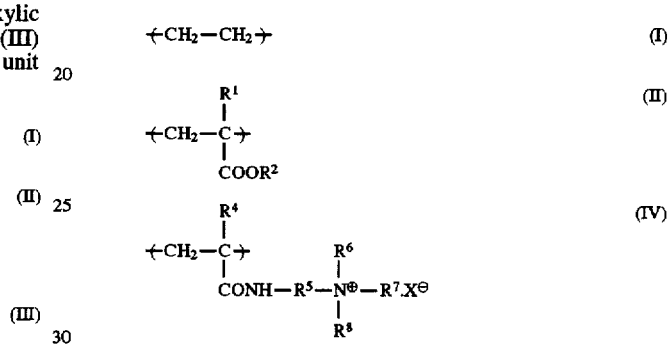

wherein, in the above formulas, $R^1$ and $R^4$ each independently represents a hydrogen atom or a methyl group, $R^2$ represents an alkyl. group containing 1 to 4 carbon atoms, $R^5$ represents an alkylene group containing 2 to 8 carbon atoms, $R^6$ and $R^7$ each independently represents an alkyl group containing 1 to 4 carbon atoms, $R^8$ represents an alkyl group containing 1 to 18 carbon atoms or an arylalkyl or aryl group containing 6 to 8 carbon atoms, and $X^-$ represents $R^9SO_3^-$ in which $R^9$ represents an alkyl group containing 1 to 12 carbon atoms or an arylalkyl or aryl group containing 6 to 18 carbon atoms, said copolymer having a weight-average molecular weight of 1,000 to 100,000.

3. An antistatic agent which comprises the cation-modified copolymer of claim 1 or 2.

4. An aqueous composition which comprises the cation-modified copolymer of claim 1 or 2 as uniformly dispersed in water.

* * * * *